June 30, 1964

G. W. GOTTULA 3,138,891

FISHING ROD CONTAINER

Filed March 9, 1961

INVENTOR.
G.W. GOTTULA
BY

United States Patent Office 3,138,891
Patented June 30, 1964

3,138,891
FISHING ROD CONTAINER
Gerard W. Gottula, Steinauer, Nebr.
Filed Mar. 9, 1961, Ser. No. 94,517
1 Claim. (Cl. 43—26)

This invention relates to fishing rod containers and more particularly it is an object of this invention to provide a fishing rod container adapted to permit the fishline to be disposed outside of the container for drying at a time when the fish pole is in storage inside the container.

A further object is to provide a container as described which is provided with means for rapidly placing the fishline in a storage position whereby it cannot be entangled during periods of non-use and whereby the fishline can be conveniently stored even though the fishpole involved is one of the type lacking a reel for line storage.

Still another object is to provide a pole holder as described having means for permitting the fish hook to be inside the container where it cannot snag on the hands even though the line itself is disposed on the outside of the container, the construction being such that the line need not be disconnected from the pole or fish hook in order to be stored on the outside of the container even though the fish hook and pole are disposed on the inside.

A further object is to provide a fishing rod container having an opening and provided with a cap and the cap having effective releasable means thereon to hold the cap in place, the holding means preferably being formed integrally and of the same material as the cap and the remainder of the container for economy of material, durability of construction, and elimination of assembly cost.

Another important object of the invention is to provide a fishing rod container in which a collapsible fishing rod is readily inserted for storage, and from which the rod is readily removed.

Other and further objects and advantages of the present invention will be apparent from the following detailed description, drawings and claim, the scope of the invention not being limited to the drawings themselves as the drawings are only for the purpose of illustrating a way in which the principles of the invention can be applied.

Other embodiments of the invention utilizing the same or equivalent principles may be used and structural changes may be made as desired by those skilled in the art without departing from the present invention and the purview of the appended claim.

Figure 2:
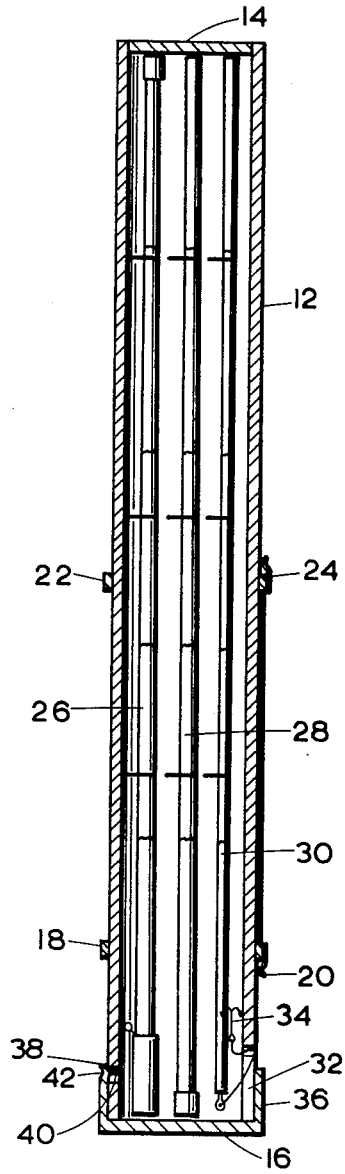
FIGURE 2 is a longitudinal section through the fishing rod or pole container, taken on line 2—2 of FIGURE 1, showing a collapsible rod in the container.
Figure 1:
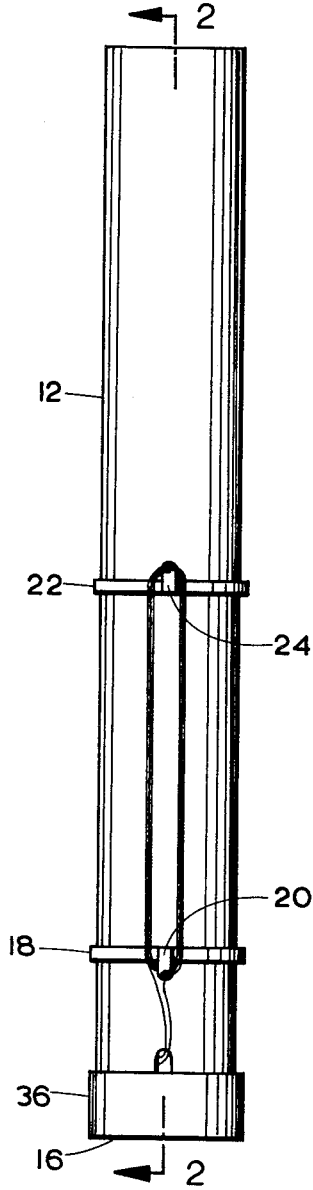
FIGURE 1 is a side elevational view of the improved fishing rod container showing the fishing line wrapped over posts on the outside of the container and passing through an opening in the lower part of the container.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout, numeral 12 indicating a tubular housing having a closure 14 in one end, and the opposite end being open, numeral 16 indicating a cap frictionally held on the open end of the housing, numeral 18 a ring having a post 20 thereon extended around the housing and spaced from the open end thereof, and numeral 22 a ring positioned around the intermediate part of the housing and having a post 24 thereon.

The housing 12 is of sufficient length to accommodate sections of a fishing rod, as indicated by the numerals 26, 28 and 30, and the open end of the housing is provided with a slot 32 whereby a fishing line trained through eyes on the sections of the fishing rod passes through the slot and is wrapped over the posts 20 and 24 extended from the rings on the outside of the housing. By this means the hook 34, which may remain on the line, may be positioned in the housing so that the danger of snagging the hands or clothing of a fisherman is substantially eliminated.

The cap 16 is provided with a flange 36 that fits snugly over the end of the housing, as shown in FIGURE 2.

With the line trained over the posts 20 and 24 on the outside of the housing it is subjected to the air continuously so that it will dry rapidly.

The fishing rod container may be mounted on a fishing rod or handle thereof, or used independent of the handle, as may be desired.

The cap 16 may slide on the end of the housing and be retained in position by friction, or the cap may be retained in position on the housing by suitable fastening means 38.

The fastening means 38 preferably comprises a hole or recess 40 in the housing 12 opening on the outside thereof, and an inwardly projecting nib 42 of the cylindrical side of the cap and preferably integral therewith and offset therefrom and adapted to be received in the hole 40. The cap 16 is formed of somewhat resilient material such as hard or softer plastic so that a flexing of the side of the cap 16 permits the nib 42 to be at least partially received in and dislodged from the recess 40, and exerting a pressure sufficient to hold the cap 16 in place.

The cap 16 may, however, be merely frictionally retained without the nib 42 and hole 40.

It will be seen that in its broadest sense, the slot 32 is actually an opening adjacent the closest end of housing 12, although more specifically, a slot is preferred as it facilitates the easy placing of the line therein. The slot or opening 32 is preferably of a width for receiving a fishline, but of an insufficient width for receiving therethrough a fish hook of the multiple-pronged nature such as shown, although in the case of a single pronged fish hook, the same could be hooked around the closest rod eyelet for keeping it from passing through the slot or opening 32.

From the foregoing description, it is thought to be obvious that a fishing rod container constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

A fishing rod container comprising an elongated tubular housing, a closure on one end of said housing, a removable closure at the other end of said housing, means for maintaining said removable closure in a position for closing the respective end of said housing at desired times, an opening through a side of said housing adjacent said other end and of a size for permitting two sections of a fishline to be disposed linearly therethrough whereby said fishline can be attached to a portion of a fish pole in such container and can have a medial portion disposed outwardly of said container for drying while in storage, said removable closure and the walls of said opening being so correlated that said removable closure when in said end closure position will not interfere with a fishline passing through said opening, and two post means attached to and laterally projecting from the outer side of said elongated housing for receiving fishline thereon, said post means being spaced longitudinally of said housing.

References Cited in the file of this patent

UNITED STATES PATENTS

| | | |
|---|---|---|
| 468,227 | Pflueger | Feb. 2, 1892 |
| 1,119,467 | Steiner | Dec. 1, 1914 |
| 1,676,868 | Petersen | July 10, 1928 |
| 2,296,781 | Farney | Sept. 22, 1942 |
| 2,418,578 | Crane | Apr. 8, 1947 |
| 2,749,645 | McKern | June 12, 1956 |
| 2,778,525 | Lerner | Jan. 22, 1957 |
| 2,791,054 | Gronek | May 7, 1957 |
| 2,962,187 | Morris | Nov. 29, 1960 |
| 2,986,836 | Conway | June 6, 1961 |

FOREIGN PATENTS

| | | |
|---|---|---|
| 144,620 | Sweden | Mar. 23, 1954 |